United States Patent
Grundke

(10) Patent No.: US 6,826,978 B2
(45) Date of Patent: Dec. 7, 2004

(54) HOLDING SYSTEM FOR A PEDAL OF A MOTOR VEHICLE

(75) Inventor: Edgar Grundke, Ditzingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 165 days.

(21) Appl. No.: 10/216,643

(22) Filed: Aug. 12, 2002

(65) Prior Publication Data

US 2003/0029268 A1 Feb. 13, 2003

(30) Foreign Application Priority Data

Aug. 11, 2001 (DE) .......................................... 101 39 592

(51) Int. Cl.[7] .................................................. G05G 1/14
(52) U.S. Cl. ........................................................ 74/512
(58) Field of Search ........................... 74/512, 513, 560

(56) References Cited

U.S. PATENT DOCUMENTS

| | | | |
|---|---|---|---|
| 5,996,439 A | 12/1999 | Elton et al. | |
| 5,996,440 A | 12/1999 | Nawata et al. | |
| 6,070,488 A | * 6/2000 | Yabusaki et al. | ............. 74/512 |
| 6,176,340 B1 | * 1/2001 | Mizuma et al. | ............. 180/274 |
| 6,276,228 B1 | * 8/2001 | Hoerster | ...................... 74/512 |
| 6,655,489 B2 | * 12/2003 | Kawai et al. | ................ 180/274 |
| 2003/0019319 A1 | * 1/2003 | Mizuma | ....................... 74/560 |
| 2003/0029267 A1 | * 2/2003 | Aoki et al. | .................... 74/560 |

FOREIGN PATENT DOCUMENTS

| | | |
|---|---|---|
| DE | 19501859 A1 | 7/1996 |
| DE | 19616845 C2 | 4/1998 |
| EP | 0873923 A1 | 10/1998 |
| EP | 1065114 A1 | 1/2001 |
| WO | WO 02/22412 A1 | 3/2002 |

OTHER PUBLICATIONS

Copy of German office action dated Jul. 5, 2002 and English translation.

* cited by examiner

Primary Examiner—David A. Bucci
Assistant Examiner—Vicky A. Johnson
(74) Attorney, Agent, or Firm—Crowell & Moring LLP

(57) ABSTRACT

A pedal of a foot parking brake is prevented from migrating into the interior of a vehicle in the event of a crash by way of a two-part pedal receiving device. The pedal receiving device has a stationary console connected with a center console cross member as well as a bearing element swivellably arranged therein. The bearing element is connected with the console by way of an adjusting and fixing device. The fixing device has hook-shaped elements, and the adjusting device has a bolt in the console extending in a slotted guide of the bearing element.

17 Claims, 4 Drawing Sheets

HOLDING SYSTEM FOR A PEDAL OF A MOTOR VEHICLE

This application claims the priority of German application 101 39 592.2, filed Aug. 11, 2001, the disclosure of which is expressly incorporated by reference herein.

BACKGROUND AND SUMMARY OF THE INVENTION

The present invention relates to a holding system for a pedal of a motor vehicle which can be connected by way of a stationary console with a cross member of a vehicle body.

A pedal arrangement for a motor vehicle is known from German Patent Document DE 195 01 859 A1. The pedal arrangement is connected by way of a bearing block with a support element of a vehicle body and is swivellably held therein. Furthermore, a bearing element which is connected with a vehicle body and in which a brake pedal is swivellably disposed is known from European Patent Document EP 0 873 923 1.

It is an object of the invention to provide a holding system for a pedal of a motor vehicle which, in the event of a crash, largely avoids pedal movement into the vehicle interior.

According to the invention, this object is achieved by constructing a pedal receiving device in two parts, having a bearing element arranged in the console, swivellably disposing the pedal in the bearing element, and holding the bearing element by an adjusting device and a fixing device in an initial position and so that it is arranged in a crash position relatively displaceably against the driving direction with respect to the stationary console. Additional advantageous characteristics are reflected in the claims.

A principal advantage achieved by the invention is that pedal migration into the vehicle interior or into the interior compartment of the vehicle is prevented in the event the vehicle crashes. For this purpose, the pedal receiving device of the system is constructed in two parts and has a bearing element arranged in the console. The pedal is swivellably disposed in the bearing element, with the bearing element being held by a joint adjusting and fixing device in an initial position. In a crash position, the bearing element is arranged relatively displaceably against the driving direction with respect to the stationary console. The pedal is taken along such that it can move in the driving direction out of the vehicle interior.

By way of the two-shell uncoupling pedal receiving device, in the event of a crash, with an adjusting and fixing device, on one hand, in the initial position, a firm fit is ensured in the console. On the other hand, in the crash position, displaceability of the bearing element is ensured without a significant migration of the pedal into the vehicle interior.

The console is preferably constructed in the shape of a U-profile in which a U-profile-shaped bearing element is held in an embedded manner. The bearing element is both swivellable in the crash position by way of the adjusting device and held in a detachable manner with respect to the console by way of the fixing device. As a result of the construction and arrangement of the console and of the bearing element, a stable pedal bearing, which is held together after a crash despite displacement of the bearing element, is achieved.

The adjusting device includes a displacement bolt guided in a guiding slot of the bearing element. The displacement bolt is held in the console while permitting a superimposed longitudinal and swivelling movement of the bearing element against the driving direction. As a result, the bearing element is advantageously displaced on the bolt so that, by way of the bearing element, the pedal is moved out of the vehicle interior back into the driving direction. The danger of injury, to the vehicle occupant can thus be avoided.

The bearing element has at least one hook part provided on a rearward-side web part of the bearing element so that, in the event of a crash, the bearing element can detach from the console. In an initial position, the at least one hook part reaches in a latching manner over an opposite web part or web wall of the console. The hook part can be unlatched in the crash position. Unlatching of the at least one hook part from the web wall of the console can take place by a tearing-off of the hook part in the event of a crash, so that the bearing element comes free of the console. The type of displaceability or the movement of the bearing element with respect to the console depends on the length of the guiding slot in the bearing element. This guiding slot may be straight, curved, or of a different shape, corresponding to the desirable displaceability, such that the bearing element can correspondingly move in the event of a crash against the driving direction while taking the disposed pedal along in the driving direction and, therefore, out of the vehicle interior.

In particular, the adjusting element is disposed—with respect to the driving direction—in a forward lower area of the console and the bearing element. The displacement bolt is preferably arranged at a distance from the swivelling axis of the pedal and approximately in a horizontal plane with this swivelling axis. The console is held on at least one forward—with respect to the driving direction—web area facing away from the bolt in a clamped-in manner in the initial position between the hook parts and a shaped-out area of the bearing element. As a result of this local arrangement of the adjusting device, essentially consisting of a guiding slot and a bolt, the bearing element can swivel against the driving direction or be displaced within the limits of the vehicle slot. The pedal swivellably held in the bearing element is in this case advantageously moved in the driving direction.

The pedal is preferably provided for a foot parking brake in a right-hand drive vehicle. In this case, mounting takes place from the front, because assemblies are provided laterally of the pedal receiving device.

An embodiment of the invention is illustrated in the drawings and will be described in detail.

DETAILED DESCRIPTION OF THE DRAWINGS

Figure 1:
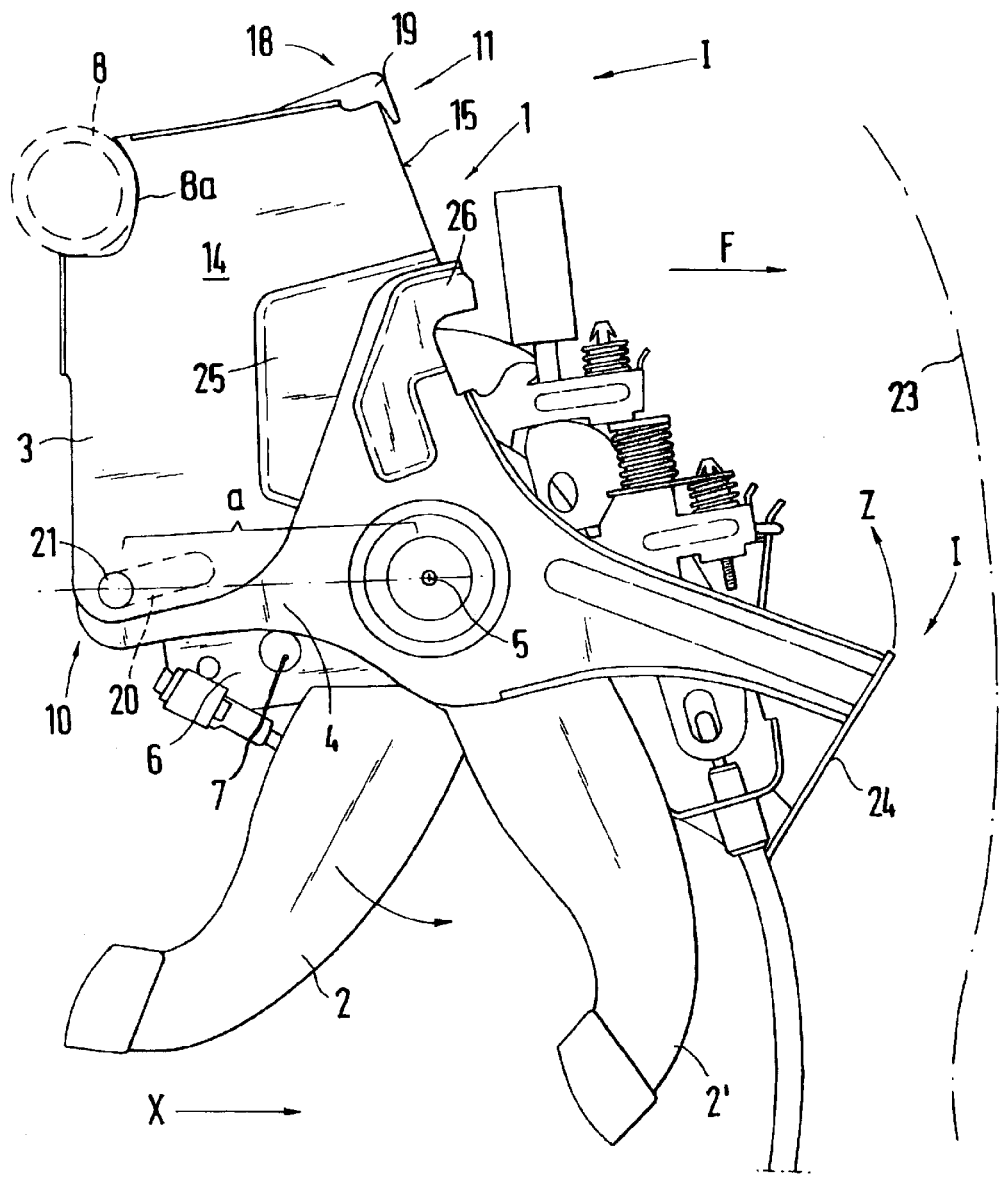
FIG. 1 is a lateral view of a holding system with a pedal bearing in a bearing element in an initial position.

A holding system 1 for a pedal 2 in the inoperative position I and of a pedal 2' in the operative position includes a two-piece pedal receiving device formed by an exterior console 3 and an interior bearing element 4. The pedal 2 is adjustably held on an axis 5 in the bearing element 4. An interior bearing part 6 is connected with this bearing element 4. The bearing part 6 has a forward position boundary 7 for the pedal 2.

The console 3 is stationary and is fixedly connected with a tube-type support 8 such as, for example, a center console cross-member. Within the console 3, by way of an adjusting device 10, the bearing element 4 is arranged to be displaceable from the initial position I into a crash position II with respect to the console 3. The bearing element 4 is detachably fastened to the console 3 by way of a fixing device 11. The console 3 is preferably provided in a U-profile-shaped manner with side cheeks 13, 14 and—viewed in the driving direction F—a rearward web or a web wall 15. The fixing device 10 is provided at the forward side of the console 3 facing away from the web 15. In the U-profile-,shaped console 3, the also U-profile-shaped bearing element 4 is arranged to rest with its legs 16, 17 against the cheeks 13, 14. The legs 16, 17 have at the upper free end 18, as the fixing device 11, at least one hook element. As illustrated, several hook elements 19, 19*a* reach in a locking manner over the web or the web wall 15 of the console 14. The fixing device 10 is provided approximately diagonally opposite the hook elements 19, 19*a* of the device 11. The fixing device is formed by a displacement bolt 21 restrictedly guided in guiding slots 20 of the bearing element 4, which displacement bolt 21 is held in the cheeks 13, 14 and surrounded by a sleeve 22.

Figure 2:
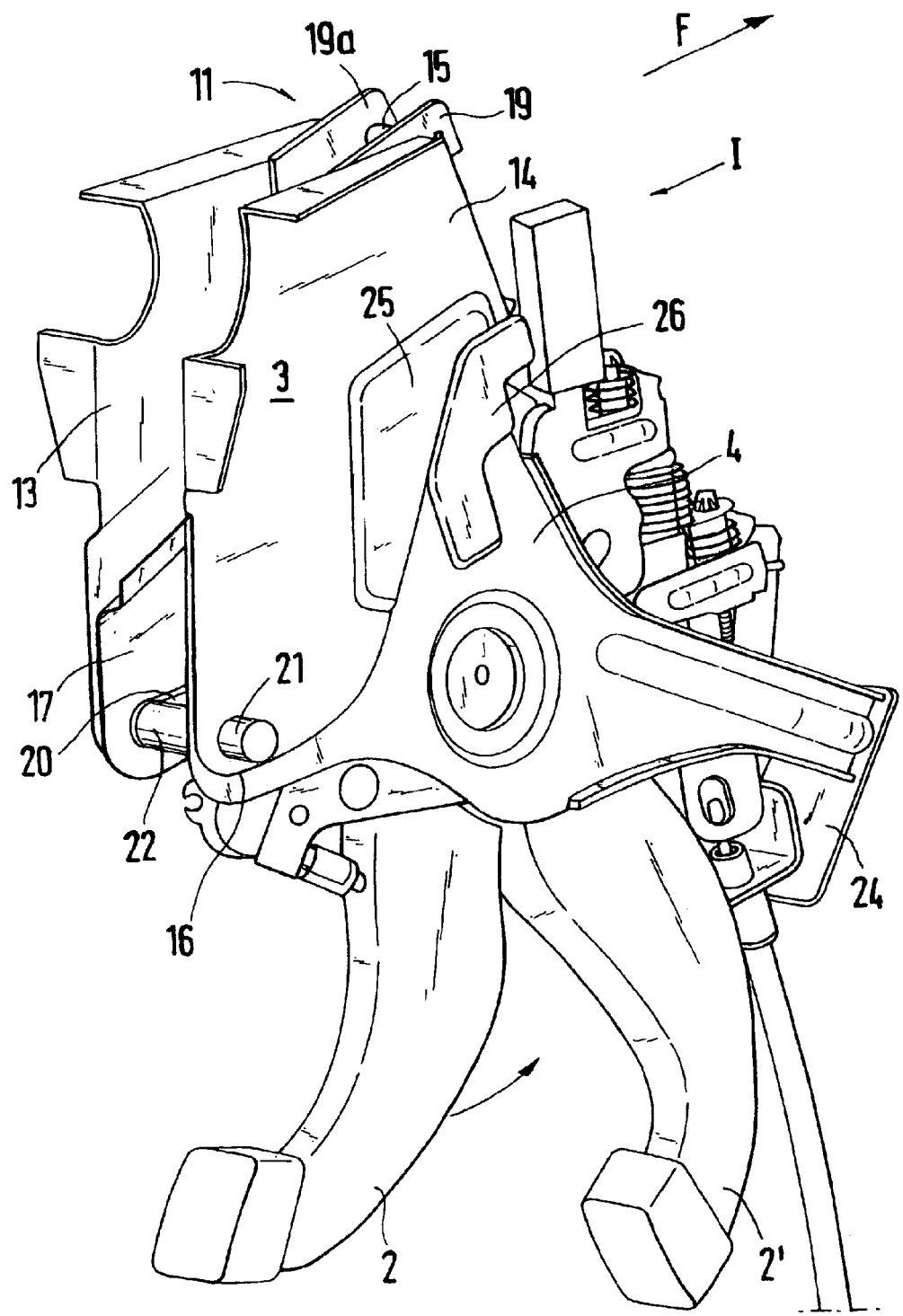
FIG. 2 is a diagrammatic representation of the holding system according to FIG. 1.

In the initial position I, as illustrated in detail in FIGS. 1 and 2, the hook elements 19, 19*a* of the device 11 reach over the web 15 of the console 3. The displacement bolt 21 or the sleeve 22 is disposed on the face side at El of the guiding slot 20.

Figure 3:
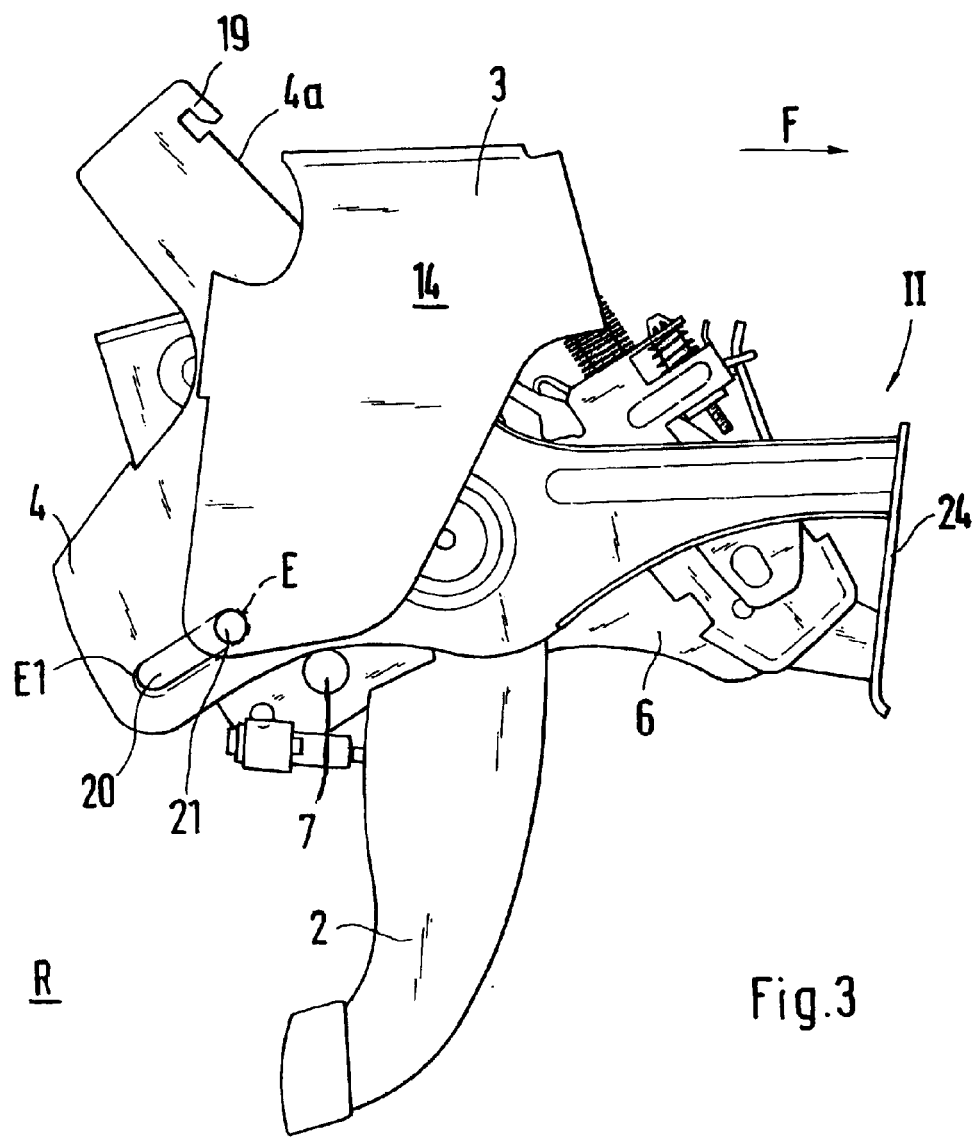
FIG. 3 is a lateral view of the holding system according to FIG. 1 in a crash position.
Figure 4:
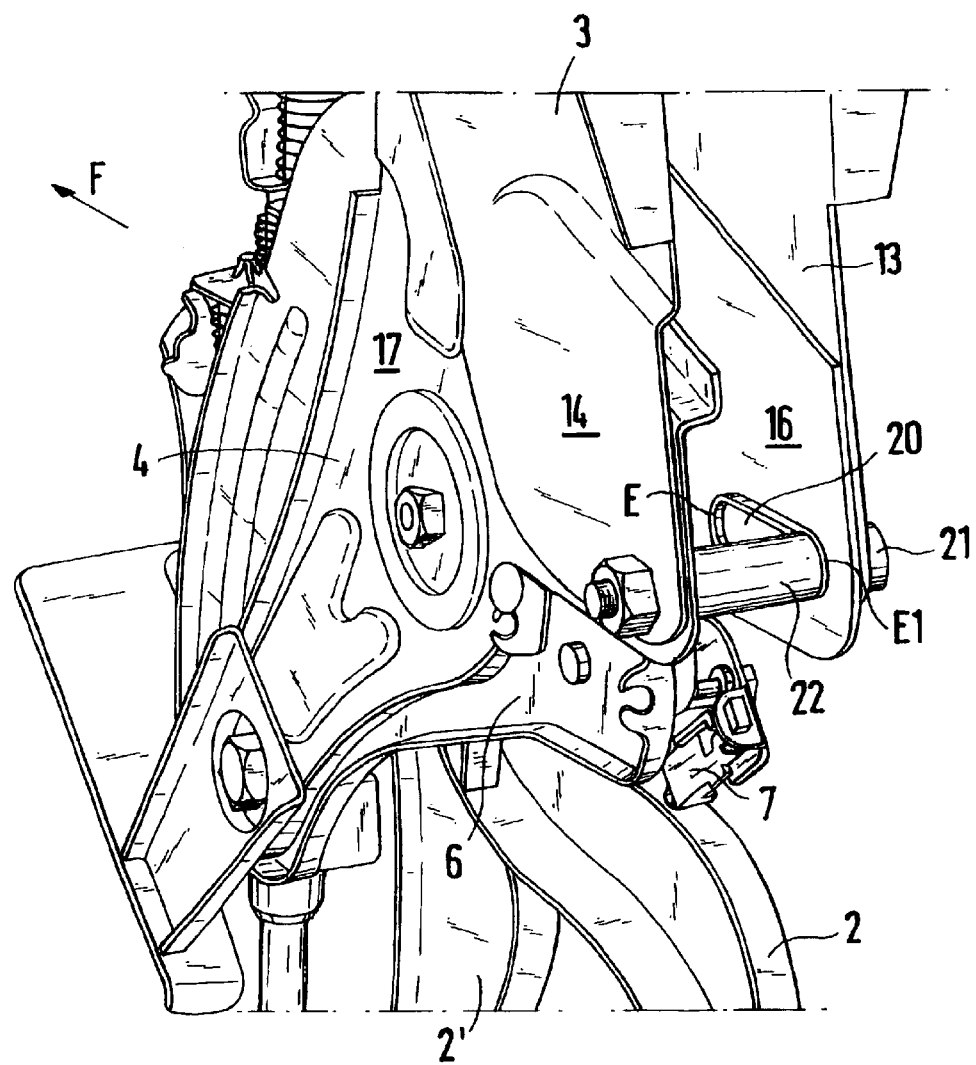
FIG. 4 is an enlarged diagrammatic representation of a fixing device between the bearing element and the console.

In the event of a crash, an impact occurs on the front wall 23 or another body part of the vehicle so that loading of the stop plate 24 which is fixedly connected with the bearing element 4 takes place. As a result, the bearing element 4 swivels upward in the direction of the arrow Z from the initial position I indicated in FIG. 1 into the crash position II indicated in FIG. 3 in the console 4. In this crash position II, the hook elements 19, 19*a* disengage from the web wall 15; the hook elements 19, 19*a* may, for example, tear off. Subsequently, the bearing element 4 is displaced in the direction of the arrow Z, and displacement of the bearing element 4 against the driving direction F takes place. In this case, the bearing element 4 is guided on the sleeve 22 of the stationary bolt 21 of the console 3 until this bolt 21 rests against the rearward end E of the guiding slot 20, as illustrated in detail in FIG. 3. As a result of the displacement of the bearing element 4, which takes place by way of a displacement movement superimposed on the swivelling movement, the pedal 2 is not displaced in the direction of the vehicle interior R. Instead, the pedal tends to be displaced in the driving direction F, out of the vehicle interior, in the direction X. The pedal is held in position by way of a bearing boundary element 7 arranged at the bearing part 6. The bearing part 6 is connected with the bearing element 4.

In the illustrated embodiment, the adjusting device 10 is provided—with respect to the driving direction F—in a forward lower area of the console 3 and the bearing element 4 between the cheeks 13, 14 and the legs 16, 17. The displacement bolt 21 with the sleeve 22 extends at a distance "a" from the axis 5 of the pedal 2 and in an approximately horizontal plane X—X which extends through the bolt 21 and through the axis 5.

The guiding slot 20 is arranged corresponding to the displaceability of the bearing element 4 with respect to the console 3. In this case, the slot may have a curved, straight or other course. This course is selected such that, in each case, when the bearing element 4 is swivelled, the pedal 2 can move in the driving direction F and out of the vehicle interior R.

As illustrated in FIG. 2, the bearing element 4 is supported on a shaped-out section 25 of the console 3 by way of a shaped-out section 26 of the bearing element 4. As a result, in the initial position I, a firm fit of the pedal receiving device or of the bearing element 4 is ensured between the hook elements 19, 19*a* and the shaped-out section 25.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A holding system for a pedal of a motor vehicle which can be connected by way of a stationary console with a cross member of a vehicle body, comprising a pedal receiving device constructed in two parts and having a bearing element arranged in the console, the pedal being swivellably disposed in the bearing element, the bearing element being held by an adjusting device and a fixing device in an initial position and arranged in a crash position relatively displaceably against the driving direction with respect to the stationary console, wherein the adjusting device includes a displacement bolt guided in a guiding slot of the bearing element, and wherein the displacement bolt is held in the console while permitting a superimposed longitudinal and swivelling movement of the bearing element against the driving direction.

2. The holding system according to claim 1, wherein the fixing device is formed by at least one hook part on a rearward-side web part of the bearing element, wherein the hook part, in the initial position, reaches in a latching manner over an opposite web part of the console, and wherein the hook part can be unlatched in the crash position.

3. The holding system according to claim 2, wherein the console is held on at least one, with respect to the driving direction, forward web area facing away from the displacement bolt in a clamped-in manner in the initial position between the hook part and a shaped-out section of the bearing element.

4. The holding system according to claim 2, wherein the bearing element, viewed in the driving direction, is connected on a forward face-side end with a stop plate which is situated opposite a front wall of the vehicle body in a spaced manner.

5. The holding system according to claim 2, wherein the console has recesses in cheeks thereof, and wherein a center console cross member of the vehicle is arranged and fastened in said recesses.

6. The holding system according to claim 1, wherein the adjusting device has a spacer sleeve arranged on the displacement bolt between legs of the bearing element.

7. The holding system according to claim 6, wherein the console has recesses in cheeks thereof, and wherein a center console cross member of the vehicle is arranged and fastened in said recesses.

8. The holding system according to claim 1, wherein, in the crash position, the bearing element is displaceable on the displacement bolt held in the console as a function of a length of the guiding slot of the bearing element.

9. The holding system according to claim 1, wherein the adjusting device is arranged, with respect to the driving direction, in a forward lower area of the console and the bearing element, wherein the displacement bolt is situated at a distance with respect to a swivelling axis of the pedal and arranged approximately in a horizontal plane together with this swivelling axis, and wherein the guiding slot, in the initial position, extends from the displacement bolt toward the front with respect to the driving direction.

10. The holding system according to claim 1, wherein the bearing element, viewed in the driving direction, is connected on a forward face-side end with a stop plate which is situated opposite a front wall of the vehicle body in a spaced manner.

11. The holding system according to claim 1, wherein the console has recesses in cheeks thereof, and wherein a center console cross member of the vehicle is arranged and fastened in said recesses.

12. A holding system for a pedal of a motor vehicle which can be connected by way of a stationary console with a cross member of a vehicle body, comprising a pedal receiving device constructed in two parts and having a bearing element arranged in the console, the pedal being swivellably disposed in the bearing element, the bearing element being held by an adjusting device and a fixing device in an initial position and arranged in a crash position relatively displaceably against the driving direction with respect to the stationary console, wherein the bearing element is a U-proffle-shaped bearing element, wherein the console has a U-shaped construction, in which the U-profile-shaped bearing element is held in an embedded manner, wherein the bearing element, in the crash position, is swivellable by way of the adjusting device and is detachably held with respect to the console by the fixing device, wherein the adjusting device includes a displacement bolt guided in a guiding slot of the bearing element, and wherein the displacement bolt is held in the console while permitting a superimposed longitudinal and swivelling movement of the bearing element against the driving direction.

13. The holding system according to claim 12, wherein the fixing device is formed by at least one hook part on a rearward-side web part of the bearing element, wherein the hook part, in the initial position, reaches in a latching manner over an opposite web part of the console, and wherein the hook part can be unlatched in the crash position.

14. The holding system according to claim 13, wherein the console is held on at least one, with respect to the driving direction, forward web area facing away from the displacement bolt in a clamped-in manner in the initial position between the hook part and a shaped-out section of the bearing element.

15. The holding system according to claim 12, wherein the adjusting device has a spacer sleeve arranged on the displacement bolt between legs of the bearing element.

16. The holding system according to claim 12, wherein, in the crash position, the bearing element is displaceable on the displacement bolt held in the console as a function of a length of the guiding slot of the bearing element.

17. The holding system according to claim 12, wherein the adjusting device is arranged, with respect to the driving direction, in a forward lower area of the console and the bearing element, wherein the displacement bolt is situated at a distance with respect to a swivelling axis of the pedal and arranged approximately in a horizontal plane together with this swivelling axis, and wherein the guiding slot, in the initial position, extends from the displacement bolt toward the front with respect to the driving direction.

* * * * *